H. O'LEARY.
HOSE COUPLING.
APPLICATION FILED JULY 16, 1912.
1,119,032.
Patented Dec. 1, 1914.
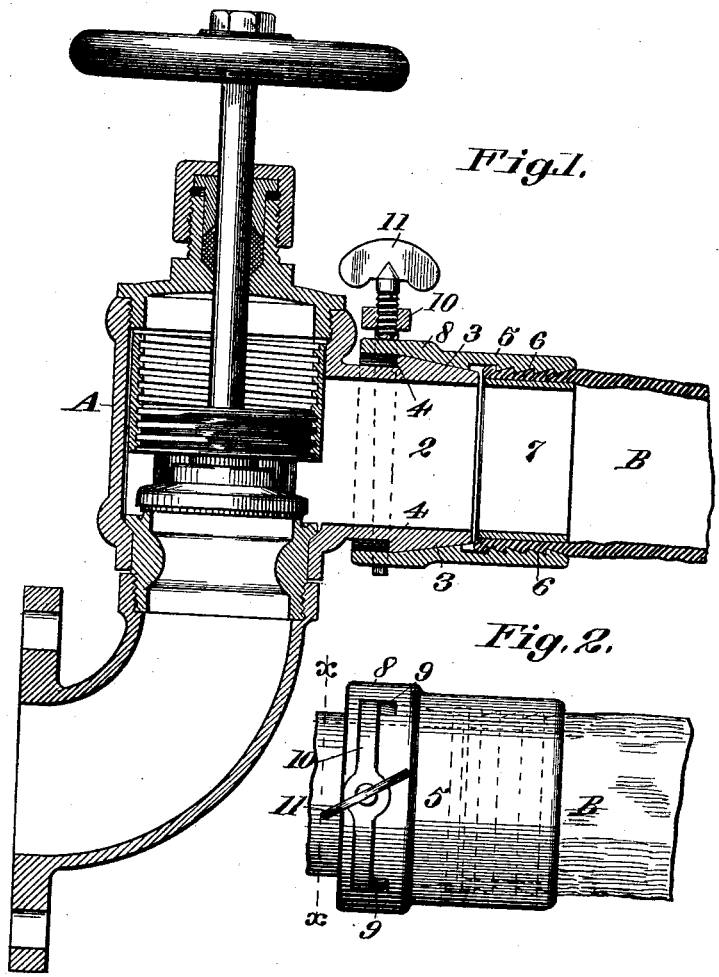
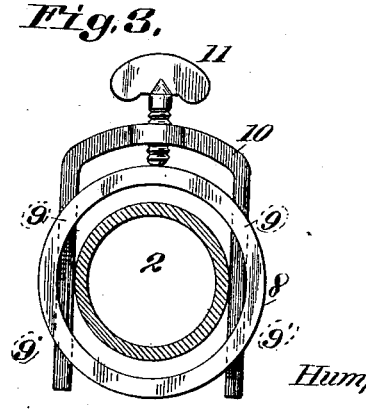
WITNESSES:
Charles Pickles
R. S. Burg
INVENTOR
Humphrey O'Leary
BY G. H. Strong
ATTORNEY

UNITED STATES PATENT OFFICE.

HUMPHREY O'LEARY, OF SAN FRANCISCO, CALIFORNIA.

HOSE-COUPLING.

1,119,032.  Specification of Letters Patent.  Patented Dec. 1, 1914.

Application filed July 16, 1912. Serial No. 709,715.

*To all whom it may concern:*

Be it known that I, HUMPHREY O'LEARY, a citizen of the United States, residing in the city and county of San Francisco and State of California, have invented new and useful Improvements in Hose-Couplings, of which the following is a specification.

This invention relates to a hose coupling.

It is the object of this invention to provide a quick-action hose coupling which can be easily and quickly coupled and uncoupled, and which is particularly adapted for use in attaching a hose to hydrants, fire-plugs, and the like, as in fire apparatus where a speedy connection is desired, and in which the use of turnable parts in effecting the coupling is dispensed with.

A further object is to provide a hose coupling which is simple in construction, efficient and which can be manufactured at small cost.

The invention comprises details of construction which will be more fully explained by reference to the accompanying drawings, in which—

Figure 1 is a vertical section of the invention as applied to a fire-plug. Fig. 2 is a plan view. Fig. 3 is a vertical section on the line X—X of Fig. 2.

In the drawings, A represents a fire-plug, the discharge opening of which consists of a horizontally extending, tubular member 2. The outer end of the tubular member 2 is formed with a conical outer face, as indicated at 3, which extends rearwardly of the member 2 and terminates in an inwardly extending, annular shoulder 4. The tubular member 2 with its conical head forms the male member of the coupling and may be formed integral with the fire-plug A, or it may be mounted on other forms of conduits, such as pipes, hose, and the like.

The female member of the coupling consists of a tube 5, the inner end of which is attached to a hose B, or other conduit, in any suitable manner. The means here shown for connecting the tube 5 and the hose B comprises a series of annular serrations 6 formed on the inner periphery of the tube 5 adjacent to its inner end, which serrations are caused to engage the end of the hose B by means of a crowding ring 7 which is inserted in the end of the hose, after the latter has been placed in the tube 5, in such a manner as to force the outer periphery of the hose into the serrations. The inner periphery of the outer end of the tube 5 is tapered to conform to the conical end 3 of the tubular member 2; the tube 5 terminating in an enlarged portion 8 which extends beyond the shoulder 4 when the parts are joined together. Formed in the upper side of the enlarged portion 8 of the tube 5 is a pair of rectangular perforations 9—9 which are elongated in the direction of the length of the tube. These perforations are formed in such a position on the tube 5 as to be disposed with their inner walls in alinement with the outer periphery of the tubular member 2, rearward of the shoulder 4. Corresponding perforations 9'—9' are formed on the underside of the tube 5 in alinement with the perforations 9—9. A detachable U-shaped wedge 10, the legs of which are slightly tapered, is provided as a means for locking the member 2 and the tube 5 together; the legs of the wedge 10 being spaced apart a distance corresponding to that separating the perforations 9—9 so that they may be passed therethrough, as indicated in Figs. 2 and 3.

In assembling the coupling, that is, to attach the tube 5 to the member 2, the former is slipped over the latter, as shown in Fig. 1; the tapered face 3 of the member 2 contacting the beveled inner face of the tube 5. The legs of the U-shaped wedge 10 are then inserted in the perforations 9—9 and passed astride of the member 2 through the perforations 9'—9'; the straight edges of the legs contacting the annular shoulder 4. The U-shaped wedge is then driven downwardly, thereby causing the tube 5 to be drawn tight upon the beveled head of the member 2 to form a tight joint. It will be seen that a rapid coupling of the parts together can thus be easily and readily effected.

As a means for facilitating the removal of the U-shaped wedge 10, a screw-jack 11 is threaded in the transverse section thereof, the lower end of which is adapted to bear against the upper face of the tube 5 between the perforations 9—9. When it is desired to remove the U-shaped wedge 10 to disconnect the coupling, the screw is turned to move downwardly in the wedge against the tube 5, so as to force the wedge in an upward direction and so loosening it that it may be easily removed.

Having thus described my invention, what

I claim and desire to secure by Letters Patent is—

In a high pressure hose coupling in combination, a pair of telescoping metal members, comprising an inner member, and an outer cylindrical member, the inner member being provided with a long conical surface, an annular shoulder formed at the large end of the conical surface, the outer member being bored on its interior to form a metal-to-metal-contact with the conical portion on the inner member, said outer member being provided with openings the axes of which intersect the cylindrical portion of the said outer member, and a U-shaped member having wedges passing through the said openings and coöperating with the annular shoulder on the inner member to draw said inner and outer members together to form a quick detachable metal-to-metal water-tight joint between said members.

In testimony whereof I have hereunto set my hand in the presence of two subscribing witnesses.

HUMPHREY O'LEARY.

Witnesses:
GEO. W. POOLE,
WILLIAM E. JOOST.

Copies of this patent may be obtained for five cents each, by addressing the "Commissioner of Patents, Washington, D. C."